March 21, 1950     W. C. SNYDER     2,501,243
MANURE LOADER ATTACHMENT
Filed Aug. 24, 1948     2 Sheets-Sheet 1
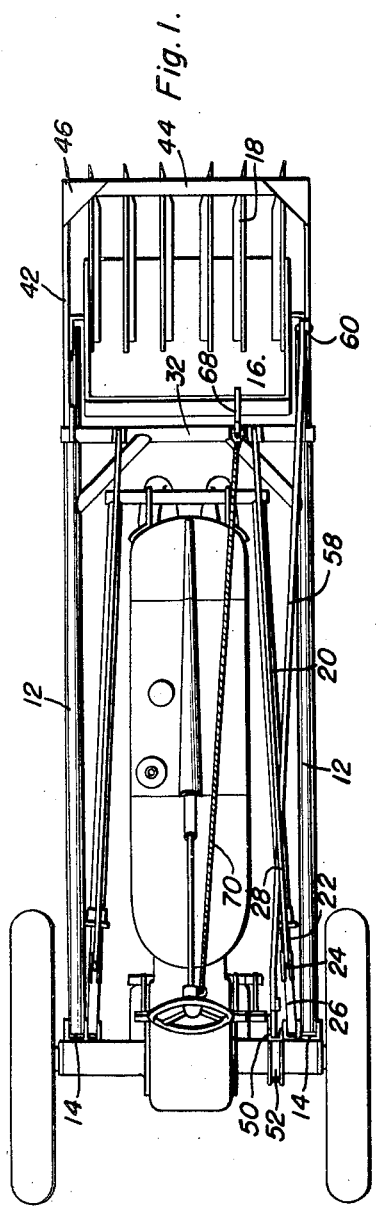
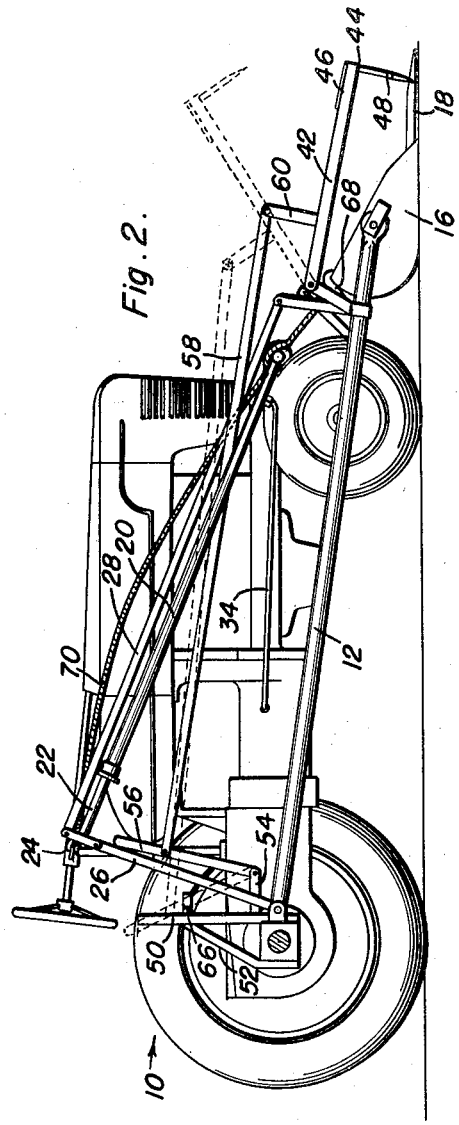
Wilford Charles Snyder
INVENTOR.

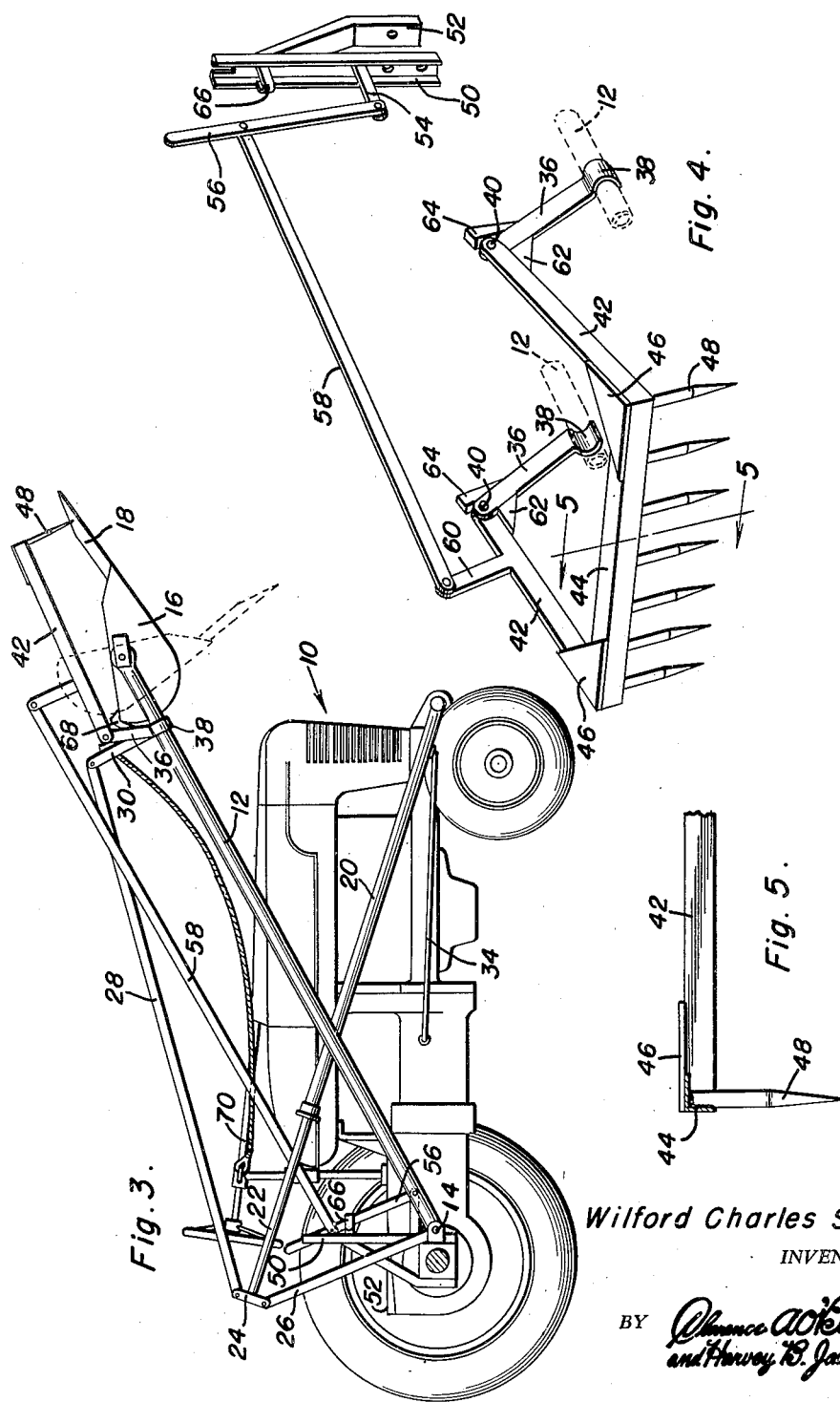

Patented Mar. 21, 1950

2,501,243

UNITED STATES PATENT OFFICE 2,501,243

MANURE LOADER ATTACHMENT

Wilford Charles Snyder, Bucyrus, Ohio

Application August 24, 1948, Serial No. 45,892

3 Claims. (Cl. 214—144)

This invention relates to new and useful improvements in loading equipment and the primary object of the present invention is to provide a manure loader attachment that will retain material on the scoop of the manure loader as the same is being raised to prevent lossage of the material normally prevalent during the raising of the scoop.

Another important object of the present invention is to provide an attachment for a manure loader that will permit greater quantities of material to be engaged and retained on the scoop of the loader than was heretofore possible and which is conveniently applied to or removed from the normal loader frame structure without in any way harmfully effecting the normal efficiency of the latter.

A further object of the present invention is to provide a manure loader attachment that is extremely small and compact in structure and which includes an operating lever that is easily accessible to an operator.

A still further aim of the present invention is to provide an attachment for manure loaders and the like that is simple and practical in construction, strong and reliable in use, efficient and durable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of a manure loading vehicle and showing the present invention applied thereon;

Figure 2 is a side elevational view of Figure 1, and with dotted lines showing the present invention in a raised and open position;

Figure 3 is a side elevational view of Figure 1, and showing the loader frame and scoop in a raised position, and with dotted lines showing the scoop in a lowered position;

Figure 4 is a perspective view of the present invention and showing the loader side beams in dotted lines; and, Figure 5 is a fragmentary longitudinal vertical sectional view taken substantially on the plane of section line 5—5 of Figure 4.

Referring now to the drawings in detail, wherein for the purpose of illustration, there is disclosed a preferred embodiment of the present invention, the numeral 10 represents a manure loading vehicle generally, that includes a pair of forwardly extending, longitudinal side beams 12 the rear terminals of which are pivoted as at 14 to the rear portion of the vehicle frame or chassis.

The forward terminals of the beams 12 pivotally support a scoop 16 having spaced digging teeth 18 that project forwardly therefrom for engaging manure or other such material that is to be loaded onto a suitable hauling vehicle or wagon.

A pair of rearwardly extending tubular members 20 are pivoted to the forward portion of the vehicle 10 and slidably engage operating bars 22 which engage links 24. The ends of the links 24 are respectively pivoted to rear pitmans 26 and forward pitmans 28 and the rear pitmans 26 are engaged with the rear portion of the vehicle 10 and the forward pitmans 28 are engaged with connector links 30 that are secured to a cross beam 32 which is mounted between the beams 12.

As illustrated in the drawings, the rods 22 are actuated by hydraulic feed lines 34, however, the same may be actuated by mechanical means or manual means without deviating from the scope of the present invention.

The present invention does not attempt to claim the above conventional and well known structure but is merely an attachment for the same that will retain material disposed on the scoop 16.

To accomplish the above desired results, there is provided a pair of holding arms or fulcrums 36 having arcuate semi-cylindrical terminals 38 that embrace the outer periphery of the side beams 12 adjacent the scoop 16. The upper free terminals of the arms 37 are pivoted as at 40 to the leg portions 42 of a substantially U-shaped frame 44 the web portion of which is braced to the leg portions 42 by diagonal corner plates 46.

A plurality of spaced parallel teeth 48 are fixed to and depend from the web portion of the frame 44 and form retainer elements that will bear against the teeth 18.

A preferably channel shaped post 50 is suitably fixed to the rear portion of the vehicle 10 and is braced thereto by an inclined bracing element 52.

An arm 54 projects outwardly from the post 50 and pivotally engages the lower terminal of a lever 56 to which there is pivoted the rear terminal of a lever 56 to which there is pivoted the rear terminal of an operating link 58. The forward terminal of the operating link 58 is pivoted to a rigid arm 60 that projects upwardly from one leg portion 42 of the frame 44.

Forward stops 62 and rear stops 64 are welded or otherwise suitably secured to the arms 36 and limit the pivotal movement of the frame 44 toward and away from the scoop 16.

In order to hold the lever 56 relative to the post 50, there is provided an arcuate bracket 66 on the post 50 that will engage the said lever 56.

In practical use of the present invention, the scoop 16 is lowered with the beams 12 to bear upon the ground and during the lowering of the beams 12, since the lever 56 is engaged in the bracket 66, frame 44 is raised relative to the scoop 16 as shown in dotted lines in Figure 2 so that as the vehicle 10 is moved forwardly material will be deposited in the scoop.

The lever 56 is then disengaged with the bracket 66 and the frame 44 is lowered, as shown in full lines in Figure 2, to retain the material on the scoop.

As the scoop 16 is then raised with the beams 12, the material will remain on the scoop until the scoop holding latch 68, pivotally mounted on the cross-beam 32, is actuated by a releasing line 70, whereby the scoop will pivot downwardly and the material will be discharged therefrom.

While the scoop is still raised, the lever 56 is reengaged in the bracket 66 so that the frame will be raised when the scoop is again lowered to the ground.

Obviously, the frame 44 may be a solid structure, including a cover plate or closure, that will retain material on the scoop, such as stone, gravel, sand or the like.

In view of the foregoing description taken in conjunction with the acompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a vehicle having a pair of forwardly extending beams pivoted at their rear terminals to the vehicle, a scoop mounted on the forward terminals of said beams, and means for raising and lowering said beams and said scoop; means for retaining material on said scoop comprising a frame, arms mounted on and projecting laterally from said beams and pivoted to said frame, retainer elements carried by said frame and engageable with said scoop, means for actuating said frame into and out of engagement with said scoop, and forward and rear stop members secured to said arms limiting the pivotal movement of said frame relative to said scoop.

2. In a vehicle having a pair of forwardly extending side beams pivoted at their rear terminals to the tractor, a scoop pivoted to the forward terminals of said beams and including digging teeth, a lift mechanism for raising and lowering the beams, and an actuating linkage for pivoting said scoop relative to said beams; means for retaining material on said scoop comprising, a substantially U-shaped frame, means pivotally securing the leg portions of said frame to said beams adjacent said scoop, stop means carried by said last mentioned means for limiting pivotal movement of said frame toward and away from said scoop, retainer elements carried by said frame engageable with the digging teeth of said scoop, and means for actuating said frame into and out of engagement with said scoop.

3. In a vehicle having a pair of forwardly extending side beams pivoted at their rear terminals to the tractor, a scoop pivoted to the forward terminals of said beams, a lift mechanism for raising and lowering the beams, and an actuating linkage for pivoting said scoop relative to said beams; means for retaining material on said scoop comprising, a substantially U-shaped frame including a pair of spaced leg portions overlying the beams and a web portion joining said leg portions, diagonal corner plates bracing the leg portions to the web portion, a pair of arms mounted on and projecting laterally from said beams, said arms having upper end portions disposed above the beams and pivoted to the leg portions, forward stops fixed to and projecting laterally from said arms and disposed beneath said leg portions for limiting downward swinging movement of said leg portions relative to said beams, forward stops fixed to and projecting above the upper end portion of said arms for limiting upward swinging movement of the leg portions relative to said beams, means operatively connected to said frame for swinging the same relative to said scoop, and retainer elements carried by and depending from the web portion of said frame and positioned adjacent the scoop.

WILFORD CHARLES SNYDER.

REFERENCES CITED

The following references are of record in the file of this patent:

UNITED STATES PATENTS

| Number | Name | Date |
|---|---|---|
| 371,729 | Arnold et al. | Oct. 18, 1887 |
| 1,013,755 | Elsasser | Jan. 2, 1912 |
| 1,045,426 | Minniear | Nov. 26, 1912 |
| 2,387,656 | Gledhill | Oct. 23, 1945 |
| 2,412,643 | Maki | Dec. 17, 1946 |
| 2,418,251 | Drott | Apr. 1, 1947 |